March 1, 1966   A. P. JENTOFT   3,237,860
DUAL DUCT AIR CONDITIONING SYSTEM WITH SEASONAL CHANGEOVER MEANS
Filed May 21, 1964   2 Sheets-Sheet 1
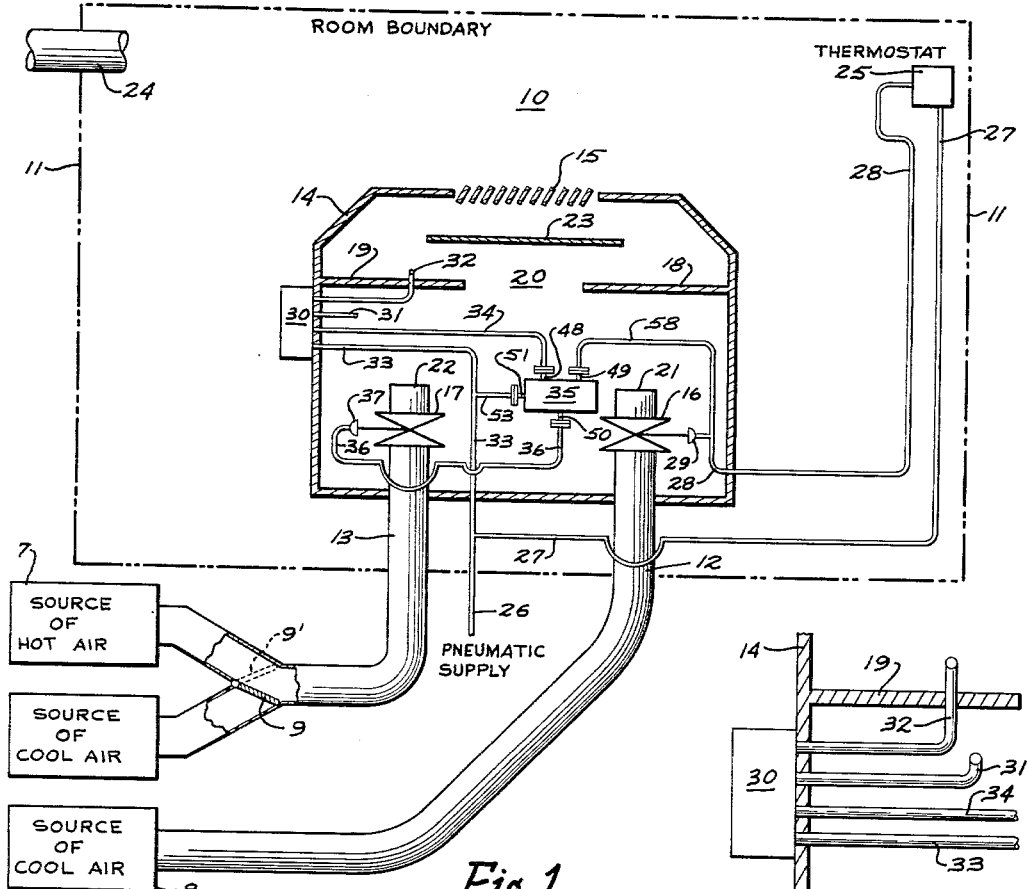
Fig. 1
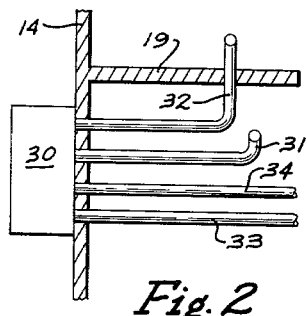
Fig. 2
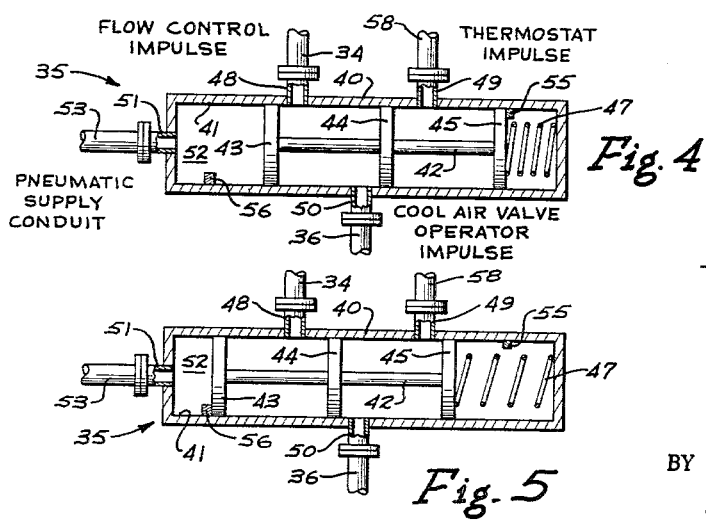
Fig. 4
Fig. 5
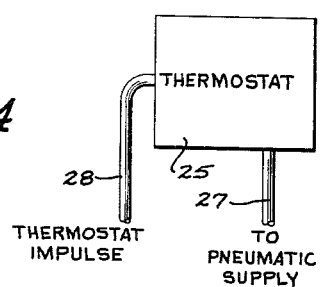
Fig. 3
INVENTOR.
ARTHUR P. JENTOFT
BY Harry B. Keck
ATTORNEY March 1, 1966  A. P. JENTOFT  3,237,860
DUAL DUCT AIR CONDITIONING SYSTEM WITH SEASONAL CHANGEOVER MEANS
Filed May 21, 1964  2 Sheets-Sheet 2
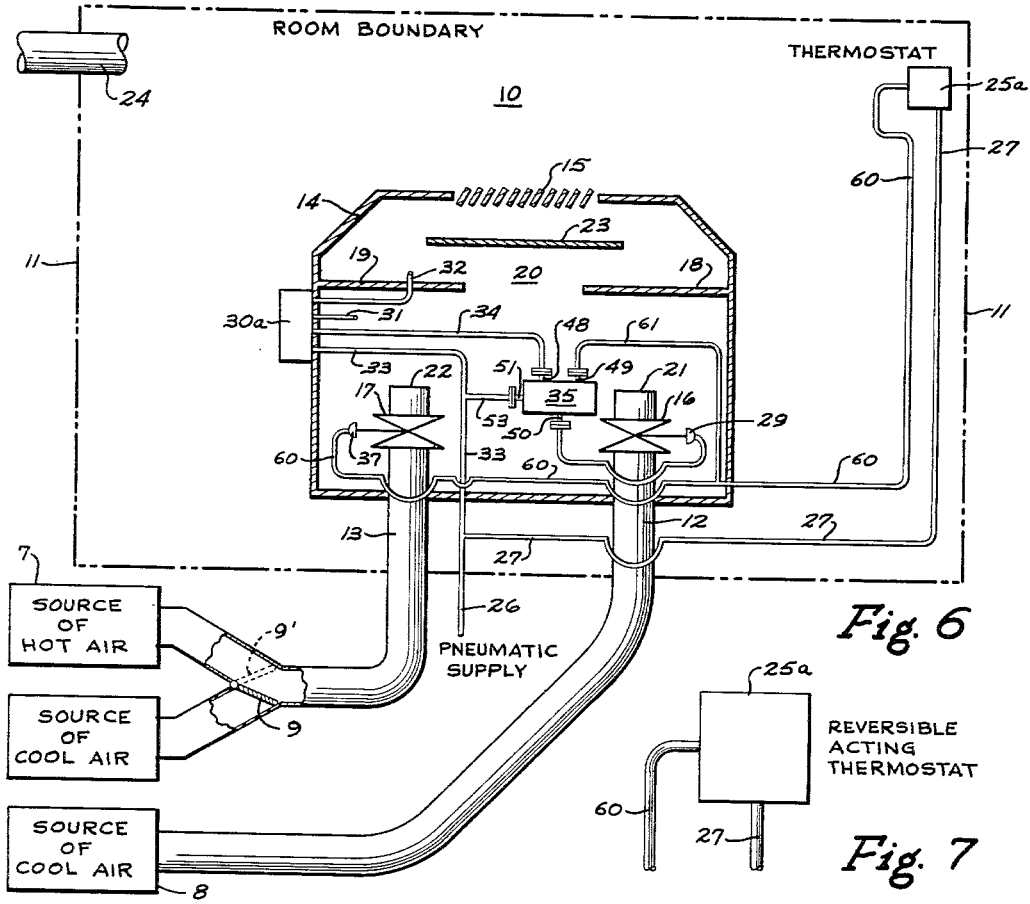
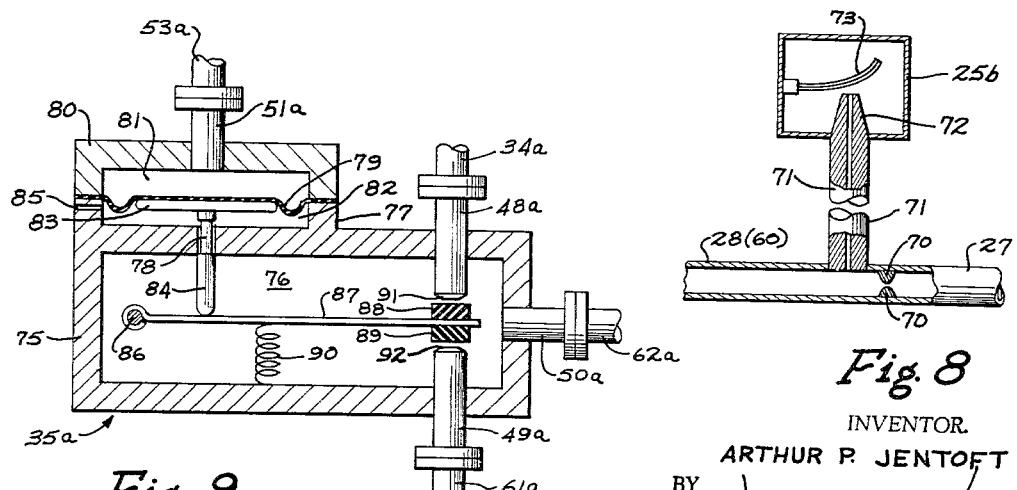
INVENTOR.
ARTHUR P. JENTOFT
BY Harry B. Keck
ATTORNEY

United States Patent Office 3,237,860
Patented Mar. 1, 1966

3,237,860
DUAL DUCT AIR CONDITIONING SYSTEM WITH SEASONAL CHANGEOVER MEANS
Arthur P. Jentoft, Wexford, Pa., assignor to H. H. Robertson Company, Pittsburgh, Pa., a corporation of Pennsylvania
Filed May 21, 1964, Ser. No. 369,145
6 Claims. (Cl. 236—1)

The present invention relates to dual duct air conditioning systems and more particularly to an improved seasonal changeover assembly for such systems.

Prior art

Dual duct air conditioning systems utilize separate streams of conditioned air for ventilation and temperature control within a building. A typical dual duct air conditioning system is illustrated in Goemann, U.S. Patent 2,729,429. A substantially constant volume of ventilation air has been provided in such systems by blending the two separate streams of air, one hot and one cool, in accordance with the temperature requirements of an individual room whereby an increase in the flow rate of hot air is accompanied by a decrease in the flow rate of cool air, and vice versa. During the winter months, i.e., when a building requires heating, the substantially constant volume air distribution systems are satisfactory. During the summer months, i.e., when the cooling requirements greatly exceed the ventilation requirements of the building, such constant volume air distributing systems are unsatisfactory. The seasonal problem is described in Goemann U.S. Patent 3,019,987 wherein it is proposed to provide cool air in sufficient volume to satisfy the thermal requirements of a building during the summer season, regardless of the fact that the total air flow will exceed the optimum ventilation air requirements, i.e., the total air flow will not be maintained substantially constant. Various mechanical changeover apparatus has been presented in Curran et al. 2,883,111 and Curran et al. 2,898,044. Means for avoiding the seasonal changeover problem utilize excess cool air duct capacity as shown in Curran 2,957,628 and 2,957,629.

A typical distribution system for discharging conditioned air from dual ducts is shown in Jentoft 3,026,041. As therein illustrated, one of the air carrying ducts is equipped with a valve which is controlled by a temperature responsive signal from a thermostat within a room of the building. The other air carrying duct is equipped with a valve which is controlled by a flow regulator which is responsive to the total flow rate of air discharged from the two air carrying ducts. Many variations of that air discharging system are described in the literature and practiced in the air conditioning industry. To the best of my knowledge, such air conditioning systems have not, heretofore, been adapted for seasonal changeover in accordance with the teachings of Goemann as set forth in U.S. Patent 3,019,987.

Statement of invention

The essence of the present invention is the provision of a signal switching means in a dual duct air distributing system. The switching means is similar to the type illustrated in the aforesaid Jentoft Patent 3,026,041. The present signal switching means is maintained in its normal position during most of the yearly cycle, i.e., during the winter months when separate streams of conditioned air are provided, one relatively hot and the other relatively cool. During those periods, the flow of inlet air from one of the air carrying ducts is controlled in response to a thermostat signal and the flow of air through the other of the air carrying ducts is controlled by a flow regulator signal which is responsive to the total air discharged from the two ducts whereby a substantially constant volume air release is achieved.

During the seasonal changeover, the signal switching means is actuated to its alternate position. Both of the air-carrying ducts are provided with cool air during seasonal changeover conditions and the flow of air from both ducts is regulated in response to a thermostat signal. During seasonal changeover conditions, the flow regulator signal is disconnected from active controlling functions.

The thermostat signal, thus controls flow of air from one of the two air-carrying ducts at all times; during seasonal changeover conditions, the thermostat signal controls the flow of air from both of the air-carrying ducts.

The thermostat signal can be normally applied to either one of the two air-carrying ducts, i.e., to the hot air-carrying duct or to the cool air-carrying duct, as will be hereinafter described in detail.

The thermostat signal corresponds to the difference between (a) the air temperature within said room and (b) a predetermined temperature for said room which may be manually regulated by the occupant of the room.

Objects

The principal object of this invention is to provide seasonal changeover features in a dual duct air conditioning system which normally employs thermostatic regulation of the flow of air from one of the dual ducts and flow compensating regulation of the flow of air from the other of the dual ducts, whereby a substantially constant volume of ventilation air flow is normally maintained.

A further object of the invention is to provide a dual duct air conditioning control system which accommodates seasonal changeover requirements regardless of whether the temperature responsive signal is applied to the normally hot air stream valve or to the normally cool air stream valve.

With these objects in view, the invention will be described in detail by reference to the accompanying drawings in which:

FIGURE 1 is a schematic illustration representing a typical building room having air inlet means, outlet means and automatic regulating means in accordance with the present invention;

FIGURES 2 and 3 are enlarged schematic illustrations of a flow regulator and thermostat, respectively, in accordance with the present invention showing tubing connections;

FIGURES 4 and 5 are illustrations of a typical signal switching means in accordance with the present invention in a normal position (FIGURE 4) and an alternate position (FIGURE 5);

FIGURE 6 is a schematic illustration corresponding with FIGURE 1 illustrating an alternative embodiment of the present invention wherein a temperature-responsive signal is applied to the normally hot air stream valve;

FIGURE 7 is an enlarged illustration, similar to FIGURE 3, showing a reverse acting thermostat which is utilized in the control system of the FIGURE 6; and FIGURE 8 is a cross-sectional illustration of an alternative thermostat piping arrangement which is useful in the practice of this invention; and FIGURE 9 is a cross-section illustration of an alternative embodiment of the signal switching means of this invention utilizing apparatus which is similar to that described in U.S. Patent 3,026,041.

Referring to FIGURE 1 there is illustrated a typical building room 10 having boundaries 11 (indicated by the broken line). Dual air-carrying ducts 12, 13 enter the room 10 into a mixing chamber 14 which has a screened or louvered aperture 15. Pneumatically-operated valves 16, 17 are provided in the air ducts 12, 13 respectively. During the winter months, relatively hot air is provided through the conduit 13 from a source of hot air at a temperature from about 70° F. to 150° F.; relatively cool air is provided through the conduit 12 from a source of cool air 8 at a temperature ranging from about 50° F. to about 70° F. Baffles 18, 19 extend partially over the cross section of the mixing chamber 14 to provide an orifice 20. All of the air emanating from outlets 21, 22 (of the air ducts 12, 13 respectively) flows through the orifice 20 before discharge through the aperture 15 into the room 10. Additional baffles 23, preferably lined with acoustic insulation material, may be provided to promote uniform mixing of the discharged air.

An air outlet conduit 24 extends outwardly from the interior of the roof 10 to permit removal of accumulated air from the room.

A pneumatic thermostat 25 is provided within the room 10 for sensing the temperature therein and for generating a corresponding thermostat signal.

A pneumatic supply conduit 26 enters the room 10 and delivers a pneumatic impulse to the thermostat 25 through a pneumatic conduit 27. The thermostat 25 bleeds a portion of the pneumatic impulse from the pneumatic conduit 27 according to the temperature existing in the room 10 as sensed by the thermostat 25. The remaining pneumatic impulse is delivered as a thermostatic signal through a thermostat signal conduit 28 to the pneumatic valve operator 29 of the cool air duct valve 16. The cool air valve 16 has an orifice cross sectional area which may be varied from zero to full-open in accordance with the thermostatic impulse applied to the operator 29.

Thus, under normal conditions, as the temperature within the room 10 decreases below a predetermined temperature level (which the room occupant desires to maintain), the valve 16 in the cool air conduit 12 is moved toward a closing direction to decrease the flow rate of the cool air into the room 10. Conversely, when the temperature within the room 10 rises above the predetermined value, the orifice opening of the air valve 16 increases to allow a greater flow rate of cool air into the room 10.

*Flow regulator*

A flow regulator 30 is provided, preferably externally of the mixing chamber 14, having a pair of sensing impulse conduits 31, 32 which are disposed upstream and downstream respectively of the air orifice 20 to detect the pressure differential attributable to the rate of air flow through theo rifice 20. The flow regulator 30 receives a pneumatic impulse through a pneumatic supply conduit 33 and bleeds that impulse in accordance with the detected pressure differential instantaneously existing between the pressure impulse conduits 31, 32. That detected pressure differential, of course, is instantaneously related to the cumulative flow of air through the orifice 20 and represents the cumulative flow of air which is discharged through the openings 21, 22. A flow regulating signal is delivered from the flow regulator impulse conduit 34 to a signal switching device 35 having an outlet impulse conduit 36 communicating with a pneumatic valve operator 37 for the valve 17. Normally the switching device 35 serves to provide an unobstructed connection between the flow regulator impulse conduit 34 and the outlet impulse conduit 36. Thus, under normal conditions, the pneumatic impulse generated by the flow regulator 30 is delivered directly through the conduit 34, the switching means 35, and the conduit 36 to the operator 37 of the valve 17.

Thus, in a normal circumstance, the conduit outlets 21, 22 provide cool and hot air respectively which passes through the orifice 20 into the room 10 through the aperture 15. The corresponding quantity of accumulated air is displaced from the room 10 through the air discharge conduit 24 or similar air disseminating channels such as leakage through doors, windows, building elements and the like.

In the event that an increased temperature is desired in the room 10, a suitable manual adjustment of the thermostat 25 can be effected. A corresponding change in the thermostat signal (in the conduit 28) will be achieved whereby the valve 16 will move in a closing direction to provide less cool air flow into the mixing chamber 14. To compensate for the decreased flow of cool air, an increase in the flow of hot air is achieved through opening the orifice area of the valve 17 until the cumulative flow rates through the orifice 20 is maintained at the substantially constant value previously set on the flow regulator 30.

A typical switching means is illustrated in its two alternate positions in FIGURES 4 and 5. As illustrated, the switching means 35 comprises a spool valve having a body 40 with a bore 41 containing a slidable three-piston spool 42 with pistons 43, 44, 45. The piston 45 is spaced apart from a closed end of the casing 40 by means of a helical spring 47. The housing 40 has two inlet ports 48, 49 and one outlet port 50. An operating port 51 communicates with an operating chamber 52 which is defined by the bore 41 and the piston 43. The operating port 51 communicates through a conduit 53 to the pneumatic supply conduit 33 whereby the pressure of the pneumatic supply is applied to the chamber 52 against the piston 43. The pneumatic supply pressure within the chamber 52 is opposed by the spring 47 and, in a normal condition, the spool 42 compresses the spring 47 shown in FIGURE 4 whereby the inlet port 48 communicates directly with the outlet port 50 between the pistons 43, 44. A stop means 55 serves as a shoulder within the bore 41 to limit the stroke of the spool 42 in opposing the spring 47. A similar stop means 56 is provided to limit the stroke of the spool 42 in the opposite direction where the spring 47 serves to maintain the alternate position of the spool 42.

*Seasonal changeover*

The thermostat impulse conduit 28 has an extension 58 which communicates with the inlet port 49 of the switching means 35.

During the seasonal changeover circumstances, the air cooling requirements of the room 10 are in excess of the ventilation air requirements. Accordingly both of the air inlet conduits 12 and 13 are provided with relatively cool, conditioned air for distribution throughout the building and specifically into the room 10. This can be accomplished by shifting the flapper valve 9 in the air supply conduit (FIGURE 1) to the broken line position 9'. Simultaneously the pressure level of the pneumatic supply is changed, and specifically, in this illustration, is diminished to a level which is insufficient to overcome the compressive resistance of the spring 47 yet is sufficient to provide a suitable thermostat signal in the thermostat impulse conduit 28.

For example, the normal pressure of the pneumatic supply might be about 20 p.s.i.g. whereas the seasonal changeover pressure of the pneumatic supply might be 15 p.s.i.g. Thus application of 20 p.s.i.g. in the chamber 52 would shift the spool 42 to the right (as seen in FIGURE 4) against the helical spring 47, whereas application of only 15 p.s.i.g. in the chamber 52 allows the spring 47 to shift the spool 42 to the left (as seen in FIGURE 5).

Accordingly the switching means 35 may be shifted from the normal spool piston shown in FIGURE 4 to the seasonal changeover spool position shown in FIGURE 5 with the spool 42 in abutment with the stop member 56 whereby the inlet port 49 communicates directly with the outlet port 50 between the pistons 44, 45. The thermostatic signal from the impulse conduit 28 is thus applied directly to the pneumatic valve operator 29 and also to the pneumatic valve operator 37 (through the conduit 58, the switching means 35 and the outlet impulse conduit 36). In the seasonal changeover circumstance, hence, both valves 16 and 17 operate in response to the thermostat impulse and both valves 16, 17 operate in response to the same signal; hence both valves move simultaneously in an opening direction and simultaneously in a closing direction.

In the event that the temperature within the room 10 exceeds the predetermined value, the thermostat 25 senses the excess and alters the thermostat impulse in the conduit 28 to move both valves 16, 17 in an opening direction to increase the flow of relatively cool air into the room 10 through the aperture 15. The flow regulator 30, of course, is disconnected during the seasonal changeover circumstances at the switching means 35 (FIGURE 5). Hence the flow regulator 30 no longer maintains constant volume of air flow through the orifice 20.

Pneumatic inversion

In order to accomplish the seasonal changeover relationships, it is essential that the pneumatic signals of the flow regulator 30 (developed in the pneumatic conduit 34) be inversely related to the thermostatic pneumatic impulses (developed in the pneumatic conduit 28).

The thermostat 25 is considered to be direct-acting if its thermostat signal (in the conduit 28) increases with an increase in the observed room temperature. The thermostat 25 is considered to be reverse-acting if its thermostat signal (in the conduit 28) decreases with an increase in the observed room temperature.

Similarly the flow regulator 30 is considered to be direct-acting if its impulse (in the conduit 34) increases with an increase in the observed pressure differential (between the impulse taps 32 and 31). The flow regulator 30 is considered to be reverse-acting if its impulse (in the conduit 34) decreases with an increase in the observed pressure differential (between the impulse taps 32 and 31).

The pneumatic valve operators 29, 37 customarily utilize an expansion diaphragm or piston which is positionable in response to the applied pneumatic pressure, and which, through mechanical linkages, determine the cross-sectional area of the valve flow passageway. Accordingly the cross-sectional area of the valve flow passageway depends upon the applied pneumatic pressure. That dependency may be either direct or reverse, of course, i.e., the valve flow passageway may increase (direct relation) or may decrease (reverse relation) in accordance with increase in the applied pneumatic pressure. Regardless of whatever the relationship is (direct or reverse), it is essential that both of the valves 16, 17 possess the same relationship, i.e., an increase in the applied pressure must result in the same change (opening or closing) in the valve passageways for both of the valves 16, 17. Accordingly the thermostat signal (in the conduit 28) will be enabled to actuate the two valves 16, 17 in concert during the seasonal changeover periods.

Because of the need for identity in the relationships of the valves 16, 17 and their operators 29, 37, the flow regulator 30 must be the inverse of the thermostat 25. As shown in FIGURE 1, when the thermostat 25 is direct-acting and the valve operators 29, 37 are also direct-acting, the flow regulator 30 must be reverse-acting. Alternatively, as shown in FIGURE 1, the thermostat 25 may be reverse-acting in which case the valve operators 29, 37 are also reverse-acting and the flow regulator 30 will be direct-acting, i.e., the inverse of the thermostat 25.

The required inverse relationship between the thermostat and the flow regulator does not persist if the thermostat signal is applied to the normally hot air conduit valve as shown in the alternative embodiment of FIGURE 6.

*FIGURE 6.—The valve in the normally-hot air duct is controlled in response to the thermostat*

The elements of FIGURE 6 are identical with those shown in FIGURE 1 except for certain pneumatic conduit connections. Similar numerals are applied to the similar elements. The thermostatic impulse conduit 60 connects with the pneumatic valve operator 37 of the valve 17 in the normally hot air conduit 13. The thermostatic impulse conduit 60 also joins a pneumatic conduit 61 which delivers the thermostatic signal to the inlet 49 of the switching means 35.

In this alternative embodiment, the thermostat 25a responds to excess observed temperature in the room 10 by moving the valve 17 of the hot air conduit 13 in a closing direction. The flow regulator 30a responds to excess air flow rate by moving the valve 16 of the cool air conduit 12 in a closing direction. Thus both the thermostat 25a and the flow regulator 30a have the same relationship—rather than the inverted relationship which was described in connection with the embodiment of FIGURE 1.

However, because the same relationship is required for normal operation, the thermostat 25a must have an inverted function to accommodate the seasonal changeover conditions. The inversion of the thermostat can be accomplished readily by the use of commerically available thermostats which are known as heating-cooling thermostats, for example, as manufactured by Johnson Service Company, Milwaukee, Wisconsin, Model T-432. The thermostat may be adapted to achieve the essential inversion upon the change of pneumatic supply pressure level which accomplishes the introduction of cool air into both of the dual duct air conduits upon inauguration of the seasonal changeover conditions. As shown in FIGURE 7, the heating-cooling thermostat 25a receives pneumatic supply pressure from the pneumatic conduit 27 and delivers a thermostat signal to the thermostat signal conduit 60. That thermostat signal may be direct (i.e., may increase in pressure with an increase in observed room temperature) or may be reverse (i.e., decreases with an increase in observed room temperature) during normal operation of the system. The thermostat signal, under seasonal changeover conditions, will have its relation inverted. That is, if the normal thermostat signal is direct-acting, then the seasonal changover thermostat signal will be reverse-acting.

The pressure level of the pneumatic supply, of course, also determines the position of the switch 35, i.e., determines whether the spool 42 is in the position of FIGURE 4 (normal operation) or of FIGURE 5 (seasonal changeover operation).

An alternative thermostat piping arrangement is illustrated in FIGURE 8 wherein the pneumatic supply conduit 27 is provided with a bore-restriction 70 and communicates directly with the thermostatic signal conduit 28 (of FIGURE 1) or 60 (of FIGURE 6). A bleed conduit 71 communicates between the thermostat 25b and the thermostatic signal conduit 28 (60). The thermostat 25b has a nozzle 72 which confronts a bimetallic strip 73 constituting a flapper to obstruct the flow of air through the nozzle 72. The bimetallic strip 73 adopts a curvilinear path according to the existing temperature and accordingly allows more or less of the pneumatic supply air to bleed through the nozzle according to the existing temperature. The residual pressure in the conduit 28 (60) thus depends upon the temperature at the thermostat 25b. This thermostatic arrangement requires only a single conduit extending to the thermostat 25b.

A further alternative embodiment of the signal switching means 35a is shown in FIGURE 9 which corresponds with the signal switching means of Jentoft Patent 3,026,041.

The signal switching means 35a comprises a hollow casing 75 having an internal chamber 76, inlet ports 48a, 49a and outlet port 50a. An annular boss 77 is provided externally of the casing 75 surrounding a plunger port 78 which extends through the casing 75. A resilient diaphragm 79 is secured across the outer surface of the annular boss 77 by peripheral sealing of a cover plate 80.

The diaphragm 79 comprises a common wall of two chambers 81, 82 which are respectively an operating chamber 81 and a vent chamber 82. The operating port 51a appears in the cover plate 80. Secured to the diaphragm 79 is a flat metal plate 83 and, mounted normally thereto is an operating plunger 84 which extends through the plunger port 78. A bleed port 85, opening to the atmosphere, extends through the annular boss 77 from the vent chamber 82.

Within the valve chamber 76, and pivotally mounted about a pin 86 is a flapper 87 suitably formed from a piece of flat metal and having at its extreme end a pair of pads 88, 89 of rubber or similar resilient material. A normally compressed spring 90 is positioned with relation to the flapper 87 to exert a force tending to cause counterclockwise movement of the flapper 87 whereby the pad 88 covers the tip 91 of the pressure regulator inlet 48a and the pad 89 is displaced from the tip 87 of the thermostatic signal conduit inlet 49a. Opposing the counterclockwise force presented by the normally compressed spring 90 is the plunger 84 which bears against the flapper 87 exerting a clockwise force about the pivot pin 86. The force exerted by the plunger 84 is determined by the pressure maintained within the operating chamber 81, i.e., the pneumtaic supply pressure.

Thus under normal conditions, the pneumatic supply pressure at the conduit 53a will be greater than the compression force of the spring 90 whereby the tip 92 of the inlet 49a will be sealed so that the pneumtaic signal from the flow regulator conduit 34a will be applied within the chamber 76 and in the valve operating conduit 62a. During seasonal changeover conditions the pneumatic supply pressure may be diminished whereby the spring 90 exerts greater pressures than the plunger 84 to move the flapper 87 so that the pad 88 seals off the tip 91 of the pneumatic inlet 48a whereby the thermostatic signal is delivered from the thermostatic signal conduit 61a to the chamber 76 and the valve operating conduit 62a.

The foregoing embodiments have utilized pneumatic signals and regulating means for positioning the flow controlling valves in the two air-carrying ducts which deliver conditioned air to separate rooms of a building. The similarity of pneumatic and electrical signal and control circuits is well known. Accordingly the use of electrical signal and control circuits is contemplated within the scope of this invention.

I claim:
1. In an air distributing system for a building room including separate conduit means each providing a separate stream of conditioned air to said room, one said separate stream being identified as a first stream and being always relatively cool and the other said separate stream being identified as a second stream and being in a usual condition, relatively hot and, in an alternative condition, being relatively cool;
    a first valve means for regulating the flow of air from said first stream through a first outlet into said room;
    a second valve means for regulating the flow of air from said second stream through a second outlet into said room;
    a thermostatic means responsive to the temperature within said room for providing a thermostatic signal corresponding to the difference between (a) the air temperature within said room and (b) a predetermined temperature for said room;
    a flow regulating means for providing a flow-regulating signal corresponding to the cumulative flow rate of air from both said first outlet and second outlet;
    signal switching means adapted in said usual condition to deliver said flow regulating signal to a selected one of said valve means and adapted in said alternative condition to deliver said thermostatic signal to said selected one of said valve means;
    signal delivery means for delivering at all times the said thermostatic signal to the other of said valve means; and means for shifting said switching means from said usual condition to said alternative condition and vice versa;
    whereby in said usual condition, the said cumulative flow rate of air from said outlets is substantially constant as a result of increase of air flow from one said outlet being accompanied with decrease of air flow from the other said outlet and vice versa; and
    whereby in said alternative condition, the said cumulative flow rate of air varies as a result of concurrent increasing flow of air from both said outlets and concurrent decreasing flow of air from both said outlets according to the said thermostatic signal applied, in said alternative condition to both said valve means.

2. The air conditioning system of claim 1 wherein the said thermostatic signal and the said flow regulating signal are pneumatic and the said signal switching means includes two inlet ports and one outlet port, and is adapted in said usual condition to communicate the said outlet port with a first one of said inlet ports, and in said alternative condition to connect a second one of said inlet ports with said outlet port;
    said flow regulating pneumatic signal being applied to said first inlet port and said thermostatic pneumatic signal being applied to said second inlet port; said outlet port communicating with a selected one of said valve means.

3. In an air distributing system for a building room including separate conduit means each providing a separate stream of conditioned air to said room, one said separate stream being identified as a first stream and being always relatively cool and the other said separate stream being identified as a second stream and being in a usual condition, relatively hot and in an alternative condition being relatively cool;
    a first valve means for regulating the flow of air from said first stream through a first outlet into said room;
    a second valve means for regulating the flow of air from said second stream through a second outlet into said room;
    a thermostatic means responsive to the temperature within said room for providing a thermostatic signal corresponding to the difference between (a) the air temperature within said room and (b) a predetermined temperature for said room;
    a flow regulating means for providing a flow-regulating signal corresponding to the cumulative flow rate of air from both said first outlet and said second outlet;
    the said flow regulating signal being inversely related to the said thermostatic signal;
    signal switching means adapted in said usual condition to deliver said flow regulating signal to said second valve means and adapted in said alternative condition to deliver said thermostatic signal to said second valve means;
    signal delivery means for delivering at all times the said thermostatic signal to said first valve means, and means for shifting said switching means from said usual condition to said alternative condition and vice versa;
    whereby in said usual condition, the said cumulative flow rate of air from said outlets is substantially constant as a result of increase of air flow from one said outlet being accompanied with decrease of air flow from the other said outlet and vice versa; and
    whereby in said alternative condition, the said cumulative flow rate of air varies as a result of concurrent increasing flow of air from both said outlets and concurrent decreasing flow of air from both said outlets according to the said thermostatic signal applied, in said alternative condition to both said valve means.

4. The air conditioning system of claim 3 wherein said thermostatic signal and said flow regulating signal are pneumatic and said signal switching means includes a first inlet port, a second inlet port and one outlet port, and is adapted in said usual condition to communicate the said outlet port with said first inlet port and in said alternative condition to communicate said outlet port with said second inlet port;

said flow regulating pneumatic signal being applied to said first inlet port and said thermostatic pneumatic signal being applied to said second inlet port;

said outlet port communicating with said second valve means.

5. In an air distributing system for a building room including separate conduit means each providing a separate stream of conditioned air to said room, one said separate stream being identified as a first stream and being always relatively cool and the other said separate stream being identified as a second stream and being in a usual condition, relatively hot and in an alternative condition being relatively cool;

a first valve means for regulating the flow of air from said first stream through a first outlet into said room;

a second valve means for regulating the flow of air from said second stream through a second outlet into said room;

a thermostatic means responsive to the temperature within said room for providing a thermostatic signal corresponding to the difference between (a) the air temperature within said room and (b) a predetermined temperature for said room;

means for inverting the correspondence of said thermostatic signal in said alternative condition;

a flow regulating means for providing a flow-regulating signal inversely corresponding to the cumulative flow rate of air from both said first outlet and said second outlet;

said flow regulating signal being directly related to the said thermostatic signal during the said usual conditions;

signal switching means adapted in said usual condition to deliver said flow regulating signal to said first valve means and adapted in said alternative condition to deliver said thermostatic signal to said first valve means;

signal delivery means for delivering at all times the said thermostatic signal to said second valve means; and means for shifting said switching means from said usual condition to said alternative condition and vice versa;

whereby in said alternative condition, the said cumulative flow rate of air from said outlets is substantially constant as a result of increase of air flow from one said outlet being accompanied with decrease of air flow from the other said outlet and vice versa; and whereby in said alternative condition, the said cumulative flow rate of air varies as a result of concurrent increasing flow of air from both said outlets and concurrent decreasing flow of air from both said outlets according to the said thermostatic signal applied, in said alternative condition to both said valve means.

6. The air conditioning system of claim 5 wherein said thermostatic signal and said flow regulating signal are pneumatic and said signal switching means includes a first inlet port, a second inlet port and one outlet port and is adapted in said usual condition to communicate the said outlet port with the said first inlet port and in said alternative condition to communicate said outlet port with said second inlet port;

said flow regulating pneumatic signal being applied to said first inlet port and said thermostatic signal being applied to said second inlet port;

said outlet port communicating with said second valve means.

References Cited by the Examiner
UNITED STATES PATENTS

| | | | |
|---|---|---|---|
| 3,026,041 | 3/1962 | Jentoft | 236—13 |
| 3,145,926 | 8/1964 | O'Day | 236—13 |

EDWARD J. MICHAEL, *Primary Examiner.*